United States Patent [19]

Nguyen et al.

[11] Patent Number: 5,151,227
[45] Date of Patent: Sep. 29, 1992

[54] PROCESS FOR CONTINUOUS SPINNING OF HOLLOW-FIBER MEMBRANES USING A SOLVENT MIXTURE AS A PRECIPITATION MEDIUM

[75] Inventors: Thanh D. Nguyen, Billerica; Christopher M. Hubby, Newton, both of Mass.

[73] Assignee: W. R. Grace & Co.-Conn., New York, N.Y.

[21] Appl. No.: 671,066

[22] Filed: Mar. 18, 1991

[51] Int. Cl.$^5$ .............................................. B29C 67/20
[52] U.S. Cl. .................................... 264/41; 264/179; 264/180; 264/184; 264/209.1
[58] Field of Search ...................... 264/41, 216, 209.1, 264/179, 180, 184

[56] References Cited

U.S. PATENT DOCUMENTS

| | | | |
|---|---|---|---|
| 3,691,068 | 9/1972 | Cross | 210/22 |
| 4,029,582 | 6/1977 | Ishii et al. | 210/500 M |
| 4,207,182 | 6/1980 | Marze | 210/23 F |
| 4,342,711 | 8/1982 | Joh et al. | 264/41 |
| 4,481,260 | 11/1984 | Nohmi | 264/41 |
| 4,612,119 | 9/1986 | Eguchi | 210/500.23 |
| 4,744,932 | 5/1988 | Browne | 264/41 |
| 4,772,391 | 9/1988 | Baker et al. | 210/490 |
| 4,970,034 | 11/1990 | Ly et al. | 264/46.4 |

FOREIGN PATENT DOCUMENTS

| | | |
|---|---|---|
| 100285 | 9/1986 | European Pat. Off. |
| 172312 | 9/1985 | Japan |
| 1000410 | 1/1986 | Japan |
| 1028409 | 2/1986 | Japan |
| 1057628 | 3/1986 | Japan |
| 1113460 | 5/1986 | Japan |
| 238834 | 10/1986 | Japan |
| 2174641 | 11/1986 | United Kingdom |

OTHER PUBLICATIONS

Cabasso et al., J. Appl. Pol. Sci., vol. 20, pp. 2377–2394, 1976.
Cabasso et al., J. Appl. Pol. Sci., vol. 21, pp. 165–180, pp. 1883–1900 1977.
Aptel et al., J. Mem. Sci., vol. 22, pp. 199–215, 1985.
Nguyen et al., North American Membrane Society, presented May 17, 1989.

Primary Examiner—Leo B. Tentoni
Attorney, Agent, or Firm—Vanessa L. Appleby; Jill H. Krafte; Steven T. Trinker

[57] ABSTRACT

Microporous hollow fiber polysulfone membranes can be prepared continuously by using a particular combination of casting solution and precipitation solution formulations, and casting conditions. The concentration of components in the precipitation solution are adjusted continuously to maintain original concentrations. The membranes are characterized by high quality, consistent performance and uniform porosity throughout the membrane.

25 Claims, 1 Drawing Sheet

PROCESS FOR CONTINUOUS SPINNING OF HOLLOW-FIBER MEMBRANES USING A SOLVENT MIXTURE AS A PRECIPITATION MEDIUM

TECHNICAL FIELD

This relates to the preparation of microporous polysulfone membranes using a solvent mixture as a precipitation medium. More specifically, the membranes prepared according to this invention can be spun in a continuous fashion with resulting high quality, consistent membrane performance. These characteristics are achieved by maintaining constant concentrations of components in the precipitation solution. Liquid-liquid membrane precipitation or coagulation is employed.

BACKGROUND OF THE INVENTION

Polysulfone membranes and hollow fiber membranes are known to the art and have been prepared to a variety of specifications. Hollow fiber membrane fabrication may be accomplished via a wet spinning technique as follows. A casting solution containing a polymer in a solvent is brought into contact with a precipitation solution containing a solvent and a non-solvent. As a result, the polymer precipitates and the membrane is formed. The porous structure and performance of the resulting membrane is determined by the polymer precipitation rate, which is governed by the exchange rate between the solvent and non-solvent. This process causes the concentrations of components in the precipitation bath to vary with the spinning time and therefore effects the polymer precipitation rate. As a consequence, the morphology characteristics, as well as the performance of the resulting membrane, will change with the spinning time.

To overcome the problems associated with the wet spinning process using a solvent mixture as a precipitation medium, a large volume precipitation bath may be employed. The large volume precipitation bath minimizes, but does not avoid, the variation in the concentrations of the precipitation medium. Further, the process becomes more difficult when dealing with large volumes due to high levels of solvent vapor, difficulties in mixing the precipitation solution and temperature control. This is particularly problematic for a continuous spinning process where a solvent mixture is used to precipitate the membrane.

In order to overcome the problems associated with the prior art processes, a new process has been developed wherein the concentration of the components in the precipitation solution are kept constant throughout the spinning process.

SUMMARY OF THE INVENTION

The process of this invention allows for the continuous preparation of polysulfone microporous membranes. The resulting membranes have consistently high quality performance characteristics.

It is a primary object of this invention to provide hollow fiber membranes which can be spun continuously without change in membrane characteristics. This is accomplished by maintaining and constantly mixing the components in the precipitation bath, which favors the solvent and non-solvent exchange rate. This action leads to better membrane formation. In relation to this, it is desired that the membranes have good tensile strength and a uniform, dense, spongy wall structure.

It is another object to teach appropriate spinning and setting conditions to allow for the continuous formation of hollow fiber membranes. This is accomplished by mixing the precipitation solution throughout the spinning process and maintaining the relative concentrations of the individual components of the precipitation solution.

It is another objective to provide a process which is very convenient for scaling up due to a compact design and low levels of solvent vapors. This process is suitable for both small- and large-scale hollow fiber membrane spinning processes.

It is another objective to provide the possibility of variation of compositions in the precipitation bath during the membrane spinning run.

Still another object is to provide membranes which are useful in industrial or pharmaceutical protein fractionation. As one specific purpose, it is intended to provide membranes which exhibit high rejection of high molecular weight materials, while allowing lower molecular weight materials to flow through. As another specific purpose, it is intended to provide membranes with a high surface area of polymer in the membrane wall in order to afford a high concentration of immobilization sites for cells or other bioactive agents.

DETAILED DESCRIPTION OF THE INVENTION

Figure 1:
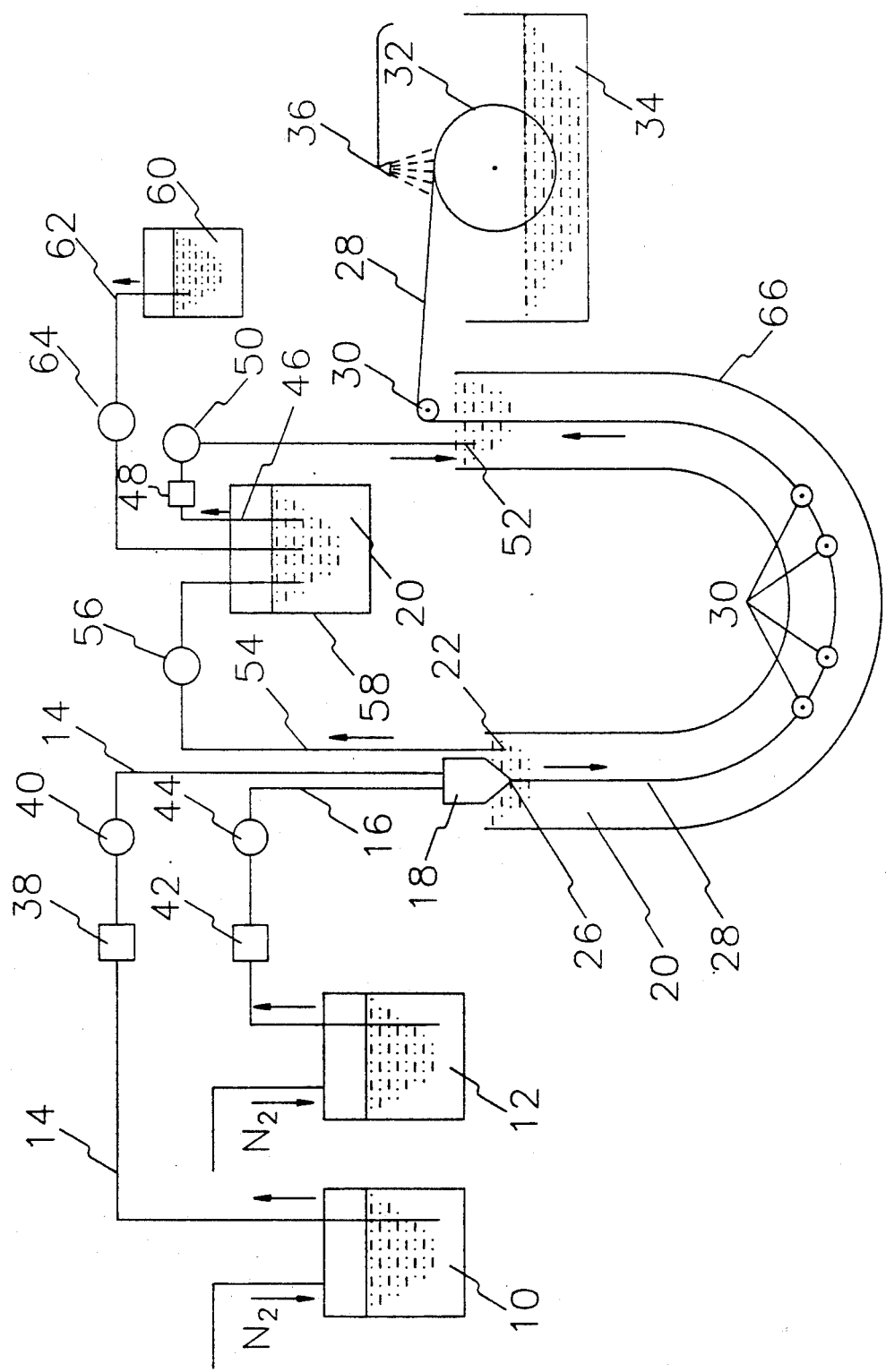
FIGURE 1 is a schematic diagram of one embodiment of the hollow fiber membrane spinning process.

A method of membrane preparation has been discovered by which isotropic polysulfone hollow fiber membranes may be continuously prepared. The continuous process comprises contacting a casting solution with a precipitation solution under conditions wherein the concentration of all components in the precipitation solution are substantially maintained throughout the spinning process. The casting solution comprises a polymer in a solvent for the polymer, and the precipitation solution comprises a solvent for the polymer and a non-solvent for the polymer. During the spinning process, solvent from the casting solution leaks into the precipitation solution causing fiber formation. To maintain concentrations of all components in the precipitation solution throughout the spinning process, non-solvent must be added to the precipitation solution at an appropriate rate depending upon the rate of solvent leakage from casting solution. The rate of non-solvent addition is determined by the following formula $r_{NSA} = (r_{SL} \div C_S \text{ in } PPT) - r_{SL}$. Rate determination is described in greater detail below. Maintenance of precipitation solution component concentrations enables the continual preparation of high quality, highly reproducible hollow fibers which have performance consistency.

The porous membranes of this invention are manufactured by a phase inversion process in a liquid-liquid precipitation scheme. This process involves the conversion of a liquid homogeneous polymer solution (casting solution) comprising two or more components into a solid, but flexible, porous fiber. The casting solution contains one or more polymers, one or more solvents for the polymer(s) and optionally one or more non-solvents for the polymer(s). The non-solvent acts as a pore-former and hereafter the non-solvent used in the casting solution will be referred to as a pore-former or pore-forming agent or compound.

The casting solution is extruded directly into a liquid precipitation medium, where formation of the membrane occurs by phase inversion, that is, by precipitation of the polymeric component from the casting solution. This is referred to as liquid-liquid phase separation. In the case of hollow fiber formation, it may also be known as wet spinning. During the initial contact with the precipitation solution, solvent is drawn from the casting solution, increasing the concentration of pore-former and polymer until the increased polymer concentration causes precipitation of the polymer from the casting solution. The membrane continues to form as both solvent and pore-former are leached out and the polymer precipitates completely.

The factors influencing membrane porosity, pore size and overall morphology are exceedingly complex. It has been discovered that a particular combination of these factors, i.e., casting solution, precipitation solution and spinning conditions, will yield an isotropic polysulfone microporous hollow fiber membrane. By "isotropic" is meant that the porosity of the membrane is uniform from one side to the other. The membrane is skinless. The membranes of this invention can be prepared using polysulfone as the sole polymeric component, or using a combination of polysulfone with other polymers.

POLYMERIC COMPONENTS

The membranes of this invention are polysulfone-based polymeric compositions. Polysulfone (PS) polymers are available in a variety of grades with respect to molecular weight, additives, etc. High molecular weight polysulfones may be preferred for preparation of membranes with additional strength. Udel TM 3500 and Udel TM 1700 polysulfone polymers (Amoco Performance Products Inc.) are suitable. Polysulfone is used as the primary polymeric component of the membrane because of such beneficial characteristics as thermal stability, resistance to acid, alkali and salt solutions, high mechanical strength, etc.

Other polymers or prepolymers can be used in combination with the polysulfone polymer, if desired, to impart various characteristics to the membrane product. Polyethylene glycol (PEG), polyvinyl pyrrolidone (PVP) or any of a variety of polyurethane prepolymers may be used with the polysulfone to prepare these membranes. For example, the isocyanate-capped polyurethane prepolymers disclosed in U.S. Pat. No. 4,137,200 (Wood et al.) are particularly suitable. The HYPOL TM polyurethane prepolymers series produced by Grace Specialty Chemicals Co., W. R. Grace & Co.-Conn., offer commercially available examples of the 200 prepolymers. The BIOPOL TM isocyanate-capped polyurethane prepolymer series available from Grace Specialty Chemicals Co., W. R. Grace & Co.-Conn., is also particularly suitable. The prepolymers of the latter series have high proportions, at least about 75%, of oxyethylene-based diols or polyols having molecular weights of up to about 30,000 or higher. This prepolymer series is further described in USSN 130,826 (Braatz et al.), "Biocompatible Polyurea-Urethane Hydrated Polymers", filed on December 9, 1987.

Polymers or prepolymers such as these are added to the polysulfone polymer in order to modify the structure and surface characteristics of the polysulfone membrane. The additional polymer or prepolymer becomes an integral part of the membrane structure. Polysulfone alone is very hydrophobic. Addition of a polymer or prepolymer such as those described above renders the membranes more hydrophilic than they would otherwise be. Moreover, addition of the BIOPOL TM polyurethane prepolymers results in membranes with increased resistance to nonspecific protein adsorption as well as enhanced biocompatibility. Whereas the polysulfone polymer precipitates out of the casting solution, a polyurethane prepolymer actually polymerizes upon contact with the aqueous precipitation solution.

Casting Solution

As described above, the casting solution is a multicomponent solution comprising polymeric, solvent and non-solvent (pore-forming) components. Any suitable polymeric component can be used in this invention. The preferred primary polymeric component will be the polysulfone polymer. Throughout the specification polysulfone will be referred to as the polymeric component; however, this is not intended to narrow the scope of polymeric components that can be used in this invention. The polymeric component would, of course, also comprise any other polymer or prepolymer which is used together with the polysulfone polymer to form the membrane. Where reference is made to the polysulfone solution or casting solution, it is intended to include all polymeric components. That is, it will include the polysulfone polymer and, where appropriate, it also will include one or more selected additional polymer or prepolymer as described above.

The solvent component of the casting solution must be one in which polysulfone (as well as any other polymer or prepolymer used) is soluble. The polysulfone polymer is soluble in various solvents, such as N-methylpyrrolidone (NMP), dimethylformamide (DMF), N,N-dimethylacetamide (DMA), cyclohexanone, chloroform, and 4-butyrolactone. NMP is the preferred solvent. The solvent in the casting solution is present at about 40 wt% to about 90 wt%, preferably about 60 wt% to about 80 wt%.

At least about 8.0 wt% and up to about 35.0 wt% polysulfone in solvent should be used, preferably about 9.0 to about 18.0 wt%. Above 35 wt%, it will be difficult or impossible to dissolve the polysulfone in the solvent. Below about 8%, precipitation will be too slow for formation of hollow fibers. Up to about 20.0 wt% of a second polymeric component, that is, one or more of the polymers or prepolymers described above, can be added to the PS solution.

Selection of the pore-forming component is very important for the ultimate characteristics of the membrane. Pore formation will vary depending on the interaction between the non-solvent (pore-former) and the other components of the casting solution, as well as the solubility of the pore-former in the precipitation solution, etc. The selection of the pore-forming agent will affect casting solution viscosity and rate of polymer precipitation, as well as membrane porosity, permeability and morphology. The pore-forming component must be soluble in the precipitation solution used in the membrane formation process.

The polymer or prepolymer component which may be added in conjunction with the polysulfone could be considered a non-solvent in that it will not dissolve PS. However, although this component may partially leach out of the membrane, it does not completely leach out as do the precipitation-medium-soluble non-solvents (poreformers) listed below.

Generally, the pore-forming component can be selected from alkanols, polyols, polyglycols, cycloketones, polyvinyl pyrrolidone, water or combinations thereof. Specific, but non-limiting, examples include methanol, t-butanol, acetone, cyclododecanone, 4-hydroxybutyric acid and polyethylene glycol. The quantity used will vary and can be determined for each pore-forming composition by routine optimization. For low molecular weight pore-formers, it will be preferred to use larger quantities in the casting solution. Where high molecular weight pore-formers are used, such as high molecular weight PVP or PEG, they may not completely leach out of the membrane during normal processing.

Precipitation Solution

The precipitation or coagulation mechanism of membrane formation is affected by the composition of the precipitation solution as well as that of the casting solution, and the composition of these two solutions are interdependent. In this disclosure, the terms "precipitation solution," "coagulation solution," "gelation solution,""quench solution" and "quench bath" are used interchangeably to refer to the solution in which the membrane is formed. For formation of hollow fiber membranes, both an outer and a center precipitation or quench solution will be employed. The precipitation solution is made up solvent, non-solvent and an optional swelling agent (also a non-solvent). Together, these components control the rate of membrane precipitation as well as the membrane characteristics, resulting in formation of the isotropic hollow fiber membrane of this invention.

The solvent content of the precipitation solution controls the rate at which the solvent comes out of the casting solution. In turn, this controls the rate of increase of the polymer concentration to the point at which the polymeric component precipitates out of the casting solution to form the membrane. The same solvent usually is used in the casting solution and the precipitation solution. NMP is the preferred solvent. Other solvents are discussed above with regard to casting solutions.

A non-solvent is used in the precipitation solution in order to precipitate the polymer from the casting solution, thus causing formation of the membrane. For practical and economical purposes, it is preferred to use water as the non-solvent component of the precipitation solution. However, other non-solvents such as methanol, ethanol, propanol, butanol, ethylene glycol, acetone, methyl ethyl ketone, or the like, as listed above, can be used instead of water, particularly when the solvent is water-immiscible. Alternatively, water and one or more other non-solvents can be used together.

The presence of a swelling agent (also a non-solvent) in the precipitation solution also serves to control the polymer precipitation rate. This component swells, but does not dissolve the polymer, thus slowing the rate of polymer precipitation. In addition, the presence of the swelling agent acts to favor the introduction of the precipitation medium into the casting solution, in exchange for the pore-former and solvent, resulting in the formation of a membrane with a high porosity. The preferred swelling agent is isopropyl alcohol (IPA). Alternatively, other components, or combinations thereof, can be used as the swelling agent. Triethylene glycol, nitrobenzene, tetrahydrofuran, dioxane, dimethyl carbonate, dimethyl sulfone, diethyl phosphate and dimethyl sulfoxide may be used as swelling agents.

In the preferred embodiment of this invention, the precipitation solution is made up of N-methyl-pyrrolidone (NMP) as the solvent, isopropyl alcohol as the swelling agent and water as the non-solvent. About 10 to 70 wt% NMP is used, preferably about 40 to 70 wt%, most preferably about 50 to 70 wt%. About 10 to 80 wt% IPA is used, preferably about 15 to 40 wt%. About 5 to 40 wt% water is used, preferably about 10 to 30 wt%. Where other solvents or swelling agents are substituted for these preferred components, these general ranges will still be applicable.

In utilizing the method of this invention to prepare hollow fiber membranes, the precipitation solution used for the outer quench bath can be the same or different from that used for the center quench fluid. In hollow fiber production, the center quench and outer quench are different phenomena. At center quench, a small volume of solution is used, which is almost in a static mode as compared with the casting solution. Conversely, the outer quench bath is present in larger volumes and in a dynamic mode. By controlling the solvent content of the two quench solutions, the phase inversion rate is controlled so as to produce an isotropic membrane. Solvent diffusion out of the casting solution will occur at a different rate at the inner and outer surfaces if the same precipitation solution is used. By adjusting the solvent and swelling agent content of the two solutions, the precipitation (or phase inversion) rate will be equilibrated, resulting in an isotropic membrane.

Hollow Fiber Spinning Conditions

In preparing hollow fiber membranes of this invention, a liquid-liquid or wet spinning process is used. That is, the casting solution is fed through an extrusion die (spinnerette) directly into a precipitation bath, while simultaneously introducing the center quench fluid through the central aperture of the spinnerette to mechanically maintain the hollow center hole of the fiber. The fiber is fabricated and simultaneously quenched as it is drawn through the precipitation bath. The relative concentrations of components in the precipitation solution are substantially maintained throughout the spinning process. By using this wet-spinning process, fibers with homogeneous pore structure and membrane morphology are produced.

The precipitation solution is held in a suitable container which is amenable to mixing, such as by counter circulation fluid flow. A preferred container is a U-shaped container in which the precipitation solution can be circulated in a direction counter to the direction in which the fiber is being drawn. Precipitation solution is pumped from a reservoir into the precipitation container, preferably in close proximity to where the fiber is removed. This action is referred to as depositing fresh precipitation solution at the fiber end of the precipitation container. The precipitation solution circulates through the precipitation container, and the spent precipitation solution is removed from the precipitation container, preferably in close proximity to where the spinnerette is submerged in the precipitation solution. This action is referred to as removing spent precipitation solution from the spinnerette end of the precipitation container. The spent precipitation solution is returned to the original reservoir. Spent precipitation solution is diluted with solvent which has leaked from the casting solution. While the precipitation solution is circulating through the container, a gradient is formed as solvent leaks from the casting solution into the precipitation solution thereby increasing the concentration of solvent in the precipitation solution.

Non-solvent is added to the reservoir in order to substantially maintain the original concentration of the individual components of the precipitation solution. The rate of addition of non-solvent is correlated to the amount of solvent which leaks into the precipitation solution from the casting solution, and by calculating the required amount of non-solvent necessary to substantially maintain initial concentrations of the precipitation solution components. A detailed description of the calculation is provided below. By substantially maintaining the relative concentrations of precipitation solution components, high quality hollow fiber membranes can be spun continuously. Additionally, the resultant hollow fiber membrane shows uniform morphology characteristics with consistency in performance. The fresh precipitation solution that is delivered to the fiber end of the container contains substantially constant concentrations of all the components of the precipitation solution as initially prepared.

One of the key factors in preparation of the isotropic hollow fiber membranes of this invention is use of the wet spinning process, that is, spinning the casting solution directly into the precipitation solution or bath. In addition, selection of appropriate solutions for the inner and outer precipitation baths is important, as is the appropriate drawing or spinning rate of the fiber as it is formed. The presence of the center quench fluid also allows for simultaneous polymer precipitation from both the inner and outer surfaces of the fiber. The spinning rate is adjusted to allow for exchange of components between the casting and precipitation solutions. The solvent and pore-forming agent are leached out of the casting solution and are replaced by the non-solvent and swelling agent from the precipitation solution. As a consequence, polymer precipitation occurs, leading to formation of the membrane. Once these initial adjustments are made to produce a membrane with the desired morphology, the circulation of fresh precipitation solution as taught by this invention is employed to consistently spin membranes which conform to the desired characteristics.

Too rapid a drawing rate will cause breakage due to insufficient membrane formation to maintain membrane integrity or will cause elongation or deformation of the pores. Conversely, too slow a drawing rate will cause defects resulting from excessive pressure by the center quench solution, which may cause blow-outs in the fiber structure. The preferred drawing rate will depend in part on the casting solution viscosity and temperature and in part on the factors described below. However, the drawing rate typically will be in the range of about 3.0 to about 30.0 feet per minute, preferably about 7.0 to about 20.0 feet per minute, and most preferably about 7.0 to about 15.0 feet per minute.

The precise spinning conditions are adjusted in order to yield hollow fibers meeting the desired physical requirements of inner diameter and wall thickness. Centering of the central aperture of the spinnerette is required in order to achieve a fiber having a uniform wall thickness. Any spinnerette suitable for the preparation of hollow fiber membranes may be used to prepare the membranes of this invention. The spinning conditions left to be adjusted are the flow rate and pressure of the casting solution, and the flow rate and pressure of the center quench fluid. These adjustments are well within the knowledge and ability of one of ordinary skill in this art. The preferred temperature for the casting solution will be in the range of ambient temperatures, although higher temperatures, e.g., up to about 70° C, may be employed to reduce the viscosity of the casting solution.

The dimensional and porosity characteristics of the membranes of this invention will depend on the desired end use as well as the various factors discussed above with respect to membrane preparation. Generally speaking, membranes can be prepared which possess a pore diameter of between about 0.01 microns and several microns. The inner diameter of the hollow fibers can range from about 100 to several thousand microns. The wall thickness can range from about ten to several hundred microns.

Following the quench bath, the hollow fiber is washed in water to remove residual solvents, non-solvents and swelling agents. Standard hollow fiber water wash procedures are used. It may be desired to treat the hollow fiber membranes with a humectant, such as glycerine, or a surfactant to improve membrane wetability. For example, the fibers may be soaked overnight in a 10–30% (vol/vol) glycerine bath. This step is optional. The fibers are then dried and prepared for use. The fibers may, for example, be bundled and potted in a cartridge.

In the preferred embodiment of this invention, isotropic hollow fiber membranes are prepared according to the process diagrammed in FIG. 1. This process was used in preparing the membranes of Examples 1-3.

Precipitation solution 20 is drawn from container 58 through conduit 46 by means of pump 50 and deposited into precipitation container 66, first being passed through filter 48 to eliminate undissolved particles. Precipitation solution 20 is circulated through precipitation container 66, preferably in a flow direction opposite to which the fiber is being drawn, where it exits below surface 22 via conduit 54 and is pumped by means of pump 56 back into container 58. Precipitation solution 20 is fresh when it enters precipitation container 66 and is spent when it exits precipitation container 66. The rate at which precipitation solution 20 circulates through containers 58 and 66 is in the range of about 300 ml/min to about 3 l/min, preferably about 1 l/min.

At a predetermined rate, calculated as described below, non-solvent solution 60 is drawn through conduit 62 by means of pump 64 into precipitation solution 20. Depending on the length of time of the spinning process and the size of container 58, it may be desirable to have a mechanism for periodically removing a portion of precipitation solution 20 from container 58.

Casting solution 12, which is maintained under nitrogen pressure, is drawn through conduit 16 by means of pump 44 to spinnerette 18, first passing through filter 42 to eliminate undissolved particles. Casting solution 12 is fed through a ring-shaped orifice in exit port 26 of spinnerette 18 to form the hollow fiber membrane.

Simultaneously, center quench solution 10, which also is maintained under nitrogen pressure, is drawn through conduit 14 by means of pump 40 to spinnerette 18, first passing through filter 38 to eliminate undissolved particles. Center quench solution 10 is fed through a second orifice at the center of the ring-shaped orifice in exit port 26 of spinnerette 18 to maintain the hollow center of the membrane.

For purposes of this invention, the fiber is spun directly into the precipitation medium. Spinnerette exit port 26 is located below surface 22 of outer precipitation solution 20 such that casting solution 12 and center quench 10 emerge from exit port 26 directly into outer precipitation solution 20. Precipitation begins immediately and hollow fiber membrane 28 is formed. Membrane 28 is drawn through outer precipitation solution 20 via rollers 30. Membrane 28 is then guided from outer precipitation solution 20 to pickup roll 32, which is partially submerged in wash bath 34. Water spray 36 is directed to the top of pickup roll 32 for further washing of membrane 28. Following the water bath, membrane 28 is dried and may be treated with a humectant or surfactant as described above. Membrane 28 is then dried and prepared for use.

The rate of addition of non-solvent to the spent precipitation solution is determined as follows:

(1) $r_{NSA} = (r_{SL} \div C_{s\ in\ PPT}) - r_{SL}$, wherein $r_{NSA}$ is the rate at which non-solvent is added to precipitation solution, $C_{S\ in\ PPT}$ is the percent of solvent in the initial precipitation solution composition, $r_{SL}$ is the rate at which solvent leaks from casting solution into precipitation solution, calculated as:

(2) $r_{SL} = (Q_{CS} \times d_{CS} \times C_{S\ in\ CS}) \div d_S$;

wherein $Q_{cs}$ is the flow rate of the casting solution, $d_{cs}$ is defined herein as density of the casting solution, $C_{S\ in\ CS}$ is the percent of solvent in the initial casting solution composition, $d_s$ is the density of solvent.

The $Q_{cs}$ can be varied over a range which is within the skill of the art, but will preferably fall within the range of about 0.2 to 2 ml/min.

The $d_{cs}$ is based on the initial casting solution formulation and can be determined by one of ordinary skill in the art. This can be estimated based on the initial composition of the casting solution as shown in Example 2.

The $d_s$ can be determined by one of ordinary skill in the art by referring to textbooks such as the Handbook of Chemistry and Physics, CRC Press, Inc.

Extended periods of hollow fiber spinning under conditions wherein the non-solvent is not added to the precipitation solution can yield highly variable fibers of questionable or inferior quality due to continuous dilution of the precipitation solution with solvent from the casting solution. By constant or intermittent addition of non-solvent and substantial maintenance of the precipitation solution composition, the high quality of the fibers can be maintained over an indefinite spinning time. Even more important, the physical characteristics of the hollow fiber being produced do not vary appreciably over the course of the spinning. This ability to control the spinning process to produce fibers of uniform characteristics from beginning to end of a spinning run significantly improves the efficiency of the process by reducing hollow fiber wastage.

For comparison it is useful to recognize that the characteristics of the hollow fiber formed will be significantly different with an increase in excess of 1–2 volume % of solvent in the precipitation solution. Such an increase can occur rather rapidly without addition of non-solvent components as is demonstrated by the following formula:

(3) $t_{INC\ 1\%} = (V \times 0.01) \div (r_{SL} \times 60\ min/hour)$;

wherein $t_{INC\ 1\%}$ is the time during which the volume of solvent in the precipitation solution increases by 1 vol%, V is the total volume of precipitation solution. This includes the combined volumes in containers 58 and 66 in the embodiment illustrated in FIG. 1, $r_{SL}$ is defined as described above.

The concentrations of the individual non-solvent components in the non-solvent mixture to be added to the precipitation solution are those of the initially prepared precipitation solution composition, as described above. Generally, a 50/50 mixture of swelling agent and non-solvent is used, but other ratios are contemplated and could easily be used.

The isotropic polysulfone-based hollow fiber membranes of this invention will find utility in industrial or pharmaceutical filtration and fractionation processes. These membranes exhibit good tensile strength, high water flux, and high hydraulic flux recovery. Membranes can be prepared which exhibit high rejection of high molecular weight species and low rejection of lower molecular weight species.

The membranes of this invention are excellently suited for plasmaphoresis, in contrast to prior art skinned membranes which do not allow sufficient plasma to flow through the membrane. The membranes are equally well suited for immobilizaton of enzymes or other reactive agents due to their high surface area and high flux, again as contrasted with skinned membranes. The fibers can thus be used in immobilization reactors, diagnostic kits, etc. The membranes of this invention may also be used for cell culture, either for fermentation reactions or in artificial organs, or the like.

The examples which follow are given for illustrative purposes and are not meant to limit the invention described herein. The following abbreviations have been used throughout in describing the invention.

CS—casting solution
cm—centimeter
GFD—gallon/ft$^2$/day
Hg—mercury
hr—hour(s)
ID—inner diameter
IgG—immunoglobulin G
IPA—isopropyl alcohol
LMH—liter/meter$^2$/hour
m—micrometer
min—minute
ml—milliliter(s)
NMP—N-methylpyrrolidone
PS—polysulfone
PPT—precipitation
psi—pounds per square inch
%—percent
vol—volume
wt—weight
$C_{S\ in\ CS}$—percent of solvent in initial casting solution Composition
$C_{S\ in\ PPT}$—percent of solvent in initial precipitation solution composition
$d_{CS}$—density of casting solution
$d_S$—density of solvent
$Q_{CS}$—flow rate of casting solution $r_{NSA}$—rate at which non-solvents are added to precipitation solution
$r_{SL}$—rate at which solvent leaks from casting solution into precipitation solution
$t_{INC\ 1\%}$—time during which the volume of solvent in the precipitation solution increases by 1 volume %

V—Volume of precipitation solution

EXAMPLES

Hollow fiber membranes of the invention were prepared following the wet spinning process described above. The overall process is depicted in FIG. 1. A spinnerette with an orifice of 0.1 cm in inside diameter (ID) and a capillary of 0.05 cm in ID was used to spin the fibers. Volumes of precipitation solution in the U-tube container and the reservoir were 18,000 ml and 2,000 ml, respectively.

Prior to casting solution delivery, the center quench solution was flowed through the spinnerette while the spinnerette was elevated above the precipitation tank to keep the glass capillary open by an uninterrupted positive pressure. The center quench solution was filtered by a 5.0 μm membrane. When the casting solution was extruded through the spinnerette, the spinnerette was lowered into the precipitation (outer quench) bath immediately.

During the fiber spinning process, the precipitation solution was circulated from the reservoir through the U-shaped container in a flow direction opposite to which the fiber was being drawn, and finally the precipitation solution was returned to the reservoir. The precipitation solution was circulated at a rate of 1 l/min. Non-solvents were added to the precipitation solution at a rate of $r_{NSA} = (r_{SL} \div C_{S\ in\ PPT}) - r_{SL}$.

The casting solution left the spinnerette in a downward direction and the fiber was drawn down through the U-shaped container, passing over guiding rollers to an upward direction. The fiber was then carried out of the precipitation tank to the take-up roll. The take-up roll was partially submerged in a water bath with a water spray on the top of the roll.

When a sufficient amount of fiber was collected on the take-up roll, the fiber bundle was removed and was cut in lengths and both ends tied with yarn. The bundles were put into a water bath overnight for further water washing. After water washing, the bundles were soaked overnight in a 10-30% (vol/vol) glycerine bath. Finally, the bundles were dried at 60° C. for 15 minutes. the fibers were potted into cartridges and tested for water permeability, protein permeability and protein passage.

EXAMPLE 1

The following conditions were used to prepare a hollow fiber membrane of the invention:

| Casting Solution Composition | |
|---|---|
| Udell TM 3500 Polysulfone (Amoco) | 10 wt % |
| Polyvinylpyrrolidone (MW 10,000) | 15 wt % |
| N-methylpyrrolidone (NMP) ($C_{S\ in\ CS}$) | 75 wt % |
| Precipitation Solution Composition | |
| NMP ($C_{S\ in\ PPT}$) | 58 vol % |
| Water | 21 vol % |
| Isopropanol (IPA) | 21 vol % |
| Fiber Spinning Conditions | |
| Casting solution flow rate ($Q_{CS}$) | 0.62 ml/min |
| Inner precipitation solution flow rate | 0.92 ml/min |
| Outer precipitation solution flow rate | 1.0 l/min |
| Fiber spinning rate | 450 cm/min |
| Relative Densities | |
| Density of casting solution ($d_{CS}$) | 1.05 g/ml |
| Density of solvent ($d_S$) | 1.03 g/ml |

These conditions indicate that the non-solvent mixture of water/IPA (50/50 by volume) must be added to the precipitation solution at a rate ($r_{NSA}$) of 0.34 ml/min to maintain the initial concentrations of precipitation solution. This rate was determined as follows:

$$r_{NSA} = (r_{SL} \div C_{S\ in\ PPT}) - r_{SL}$$
where
$$\begin{aligned} r_{SL} &= (Q_{CS} \times d_{CS} \times C_{S\ in\ CS}) \div d_S \\ &= (0.62\ ml/min \times 1.05\ g/ml \times 0.75) \div 1.03\ g/ml \\ &= 0.47\ ml/min \end{aligned}$$
such that
$$\begin{aligned} r_{NSA} &= (0.47\ ml/min \div 0.58) - 0.47\ ml/min \\ &= 0.34\ ml/min \end{aligned}$$

If the non-solvent mixture was not added to the precipitation solution at this rate, then the concentration of NMP in the precipitation solution would increase 1 volume % after every 7.1 hours of spinning ($t = (V \times 0.01) \div (r_{SL} \times 60)$). Therefore, after only 7.1 hours the quality of the fibers would not be consistent and would continue to become more inferior as time went on.

However, the fibers of the present invention were made using the process of the invention wherein the non-solvent mixture was added to the precipitation solution at the appropriate rate to maintain substantially constant concentration of the precipitation solution. The fibers were spun continuously for more than 26 hours without altering the performance characteristics.

The performance of the fibers was evaluated after 3 and 26 hours of spinning, and the properties were nearly identical. Fibers were obtained which had an ID of 510 microns with a wall thickness of 75 microns. The fibers had a narrow pore size distribution with a mean pore size of 0.70 microns. The pure water permeability of these fibers was 4,650 LMH/psi. The protein flux with respect to IgG protein solution (3 g/l) was 2,760 LMH/psi with a quantitative protein passage.

EXAMPLE 2

The following conditions were used to prepare another hollow fiber membrane of the invention:

| Casting Solution Composition | |
|---|---|
| Udell TM 3500 polysulfone | 12 wt % |
| Polyvinylpyrrolidone | 15 wt % |
| NMP ($C_{S\ in\ CS}$) | 73 wt % |
| Precipitation Solution Composition | |
| NMP ($C_{S\ in\ PPT}$) | 60 vol % |
| Water | 20 vol % |
| IPA | 20 vol % |
| Fiber Spinning Conditions | |
| CS flow rate ($Q_{CS}$) | 0.465 ml/min |
| Inner precipitation solution flow rate | 0.565 ml/min |
| Outer precipitation solution flow rate | 1.0 l/min |
| Fiber spinning rate | 450 cm/min |
| Relevant Densities | |
| Density of casting solution ($d_{CS}$)* | 1.06 g/ml |
| Density of solvent (NMP) ($d_S$) | 1.03 g/ml |
| Density of polysulfone ($d_{PS}$) | 1.24 g/ml |
| Density of polyvinylpyrrolidone ($d_{PVP}$) | 1.03 g/ml |

*$d_{CS} = 0.12\ (d_{PS}) + 0.15\ (d_{PVP}) + 0.73\ (d_{NMP})$
$= 0.12\ (1.24) + 0.15\ (1.03) + 0.73\ (1.03)$
$= 1.06\ g/ml$

Under these spinning conditions without the addition of non-solvents to the precipitation solution, the concentration of NMP in the bath will increase 1 volume % after every 9.5 hours of spinning (determined as described in Example 1). To maintain the concentration of NMP in the precipitation bath, 0.23 ml/min ($r_{NSA}$) of a Water/IPA mixture (50/50 in volume) was added into the reservoir.

This rate was determined using the formula specified in Example 1 as follows:

$$r_{NSA} = (r_{SL} \div C_{S\ in\ PPT}) - r_{SL}$$

where $$r_{SL} = (Q_{CS} \times d_{CS} \times C_{S\ in\ CS}) \div d_S$$
$$= (.465\ ml/min \times 1.06\ g/ml \times 0.73) \div 1.03\ g/ml$$
$$= 0.35\ ml/min$$

such that $$r_{NSA} = (0.35\ ml/min \div 0.6) - 0.35\ ml/min$$
$$= 0.23\ ml/min$$

Fibers were spun continuously for more than 63 hours without altering the performance characteristics. The fiber's ID and wall thickness were 400 microns and 70 microns, respectively. The fiber obtained has a narrow pore size distribution with a mean pore size of 0.65 microns. Table I shows the performance of the fibers obtained at different spinning times.

TABLE I

| Spinning Time (hr.) | Water Permeability (LMH/Psi) | IgG Data* Permeability (LMH/Psi) | Passage (%) |
| --- | --- | --- | --- |
| 12 | 2900 | 1070 | 100 |
| 29 | 2800 | 1170 | 100 |
| 38 | 2500 | 950 | 100 |
| 54 | 2200 | 1000 | 100 |
| 59 | 2500 | 1100 | 100 |
| 63 | 2600 | 1040 | 100 |

*Testing Conditions:
IgG concentration = 3 g/L
Transmembrane pressure = ~1 psi.
Shear rate = 3000. sec$^{-1}$
Operating time = 15 min.

EXAMPLE 3

The following conditions were used to prepare another hollow fiber membrane of the invention:

| Casting Solution Composition | |
| --- | --- |
| Udell TM 3500 polysulfone | 13 wt % |
| Polyvinylpyrrolidone | 15 wt % |
| NMP ($C_{S\ in\ CS}$) | 72 wt % |
| Precipitation Solution Composition | |
| NMP ($C_{S\ in\ PPT}$) | 60 vol % |
| Water | 20 vol % |
| IPA | 20 vol % |
| Fiber Spinning Conditions | |
| CS flow rate ($Q_{CS}$) | 0.465 ml/min |
| Inner precipitation solution flow rate | 0.565 ml/min |
| Outer precipitation solution flow rate | 1.0 l/min |
| Fiber spinning rate | 450 cm/min |

Under these spinning conditions, the concentration of NMP in the precipitation bath will increase 1 volume % every 9.5 hours of spinning (determined as described in Example 1). To maintain concentration of NMP in the bath, 0.23 ml/min ($r_{NSA}$) of a Water/IPA mixture (50/50 in volume) was added into the reservoir (determined as described in Example 2). Fibers were spun continuously for 24 hours, and the fibers obtained showed a consistency in performance.

The fiber ID and wall thickness were 400 microns and 70 microns. The mean pore size was 0.45 microns, and the water permeability was 1500 LMH/psi.

We claim:

1. In a continuous process for forming a microporous polymeric hollow fiber membrane comprising contacting a casting solution comprising a polymer in a solvent for said polymer with both an inner precipitation solution comprising a solvent and a non-solvent for said polymer and an outer precipitation solution comprising a solvent and a non-solvent for said polymer, the improvement comprising maintaining substantially constant concentrations of all components in said outer precipitation solution throughout the process by addition of non-solvent for said polymer to said outer precipitation solution, wherein the rate of addition of said non-solvent to said outer precipitation solution is determined by the formula:

$$r_{NSA} = (r_{SL} \div C_{S\ in\ PPT}) - r_{SL}.$$

2. The process of claim 1 wherein said outer precipitation solution is constantly mixed.

3. The process of claim 2 wherein said outer precipitation solution is circulated through a U-shaped container.

4. The process of claim 3 wherein said outer precipitation solution is circulated in a direction opposite to the hollow fiber spinning direction.

5. The process of claim 1 wherein said polymer is polysulfone.

6. The process of claim 5 wherein said casting solution comprises about 8.0 to about 35.0 wt % polysulfone.

7. The process of claim 6 wherein said casting solution comprises about 9.0 to about 18.0 wt % polysulfone.

8. The process of claim 1 wherein said addition of non-solvent to said outer precipitation solution is continuous or intermittent.

9. The process of claim 1 wherein said inner and outer precipitation solutions further comprise a swelling agent which is a non-solvent for said polymer.

10. The process of claim 1 wherein said casting solution further comprises up to about 20 wt % of a second polymeric component and a pore-forming component.

11. The process of claim 5 in which said non-solvent for polysulfone comprises water, methanol, ethanol, propanol, butanol, ethylene glycol, acetone or methyl ethyl ketone.

12. The process of claim 9 in which said outer and center precipitation solutions comprise about 10.0 to 70.0 wt % solvent, about 10.0 to 80.0 wt % swelling agent, and about 5.0 to 40.0 wt % water.

13. The process of claim 12 in which said solvent is N-methyl-pyrrolidone.

14. A process for forming a microporous polysulfone hollow fiber membrane, comprising:
  (a) preparing, in a solvent for polysulfone, a casting solution comprising about 8.0 to about 35.0 wt.% of a polysulfone polymer, up to about 20.0 wt.% of a second polymeric component, and a pore-forming component,
  (b) preparing an outer precipitation solution comprising a solvent for polysulfone, a non-solvent for polysulfone and a swelling agent,
  (c) preparing a center precipitation solution comprising a solvent for polysulfone, a non-solvent for polysulfone and a swelling agent,
  (d) providing a precipitation bath containing said outer precipitation solution and having a hollow fiber-forming spinnerette partially immersed therein, (e) extruding said casting solution and said center precipitation solution through said spinnerette directly into said precipitation bath to form an extruded hollow fiber membrane, (f) maintaining substantially constant concentrations of said outer precipitation solution components by addition of non-solvent at a rate determined by the formula:

$$r_{NSA} = (r_{SL} \div C_{S \, in \, PPT}) - r_{SL},$$

(g) drawing said extruded hollow fiber membrane through said precipitation bath, and (h) drying said extruded hollow fiber membrane.

15. The process of claim 14 wherein said outer precipitation solution is constantly mixed.

16. The process of claim 15 wherein said outer precipitation solution is circulated through a U-shaped container.

17. The process of claim 16 wherein said outer precipitation solution is circulated in a direction opposite to the hollow fiber spinning direction.

18. The process of claim 14 wherein said casting solution comprises about 9.0 to about 18.0 wt % polysulfone.

19. process of claim 14 wherein said second polymeric component is polyethylene glycol, polyvinyl pyrrolidone or a polyurethane prepolymer.

20. The process of claim 14 wherein said pore-forming component is selected from alkanols, polyols, polyglycols, cycloketones, polyvinyl pyrrolidone, and water.

21. The process of claim 20 in which said pore-forming component is methanol, t-butanol, acetone, cyclododecanone, 4-hydroxybutyric acid or polyethylene glycol.

22. The process of claim 14 in which said non-solvent for polysulfone comprises water, methanol, ethanol, propanol, butanol, ethylene glycol, acetone or methyl ethyl ketone.

23. The process of claim 14 in which said swelling agent comprises isopropyl alcohol, triethylene glycol, nitrobenzene, tetrahydrofuran, dioxane, dimethyl carbonate, dimethyl sulfone, diethyl phosphate or dimethyl sulfoxide.

24. The process of claim 14 in which said outer and center precipitation solutions comprise about 10.0 to 70.0 wt % solvent, about 10.0 to 80.0 wt % swelling agent, and about 5.0 to 40.0 wt % water.

25. The process of claim 24 in which said solvent is N-methyl-pyrrolidone.

* * * * *